(12) United States Patent
Irving-Antillón

(10) Patent No.: US 6,797,664 B2
(45) Date of Patent: Sep. 28, 2004

(54) SULPHURED-METALLIC COORDINATED COMPLEXES IN POLYADDITIVE CATALYSIS

(75) Inventor: Nicholas Moffat Irving-Antillón, Pascogoula, MS (US)

(73) Assignee: Rio Oeste, S.A., Guatemala (GT)

(*) Notice: Subject to any disclaimer, the term of this patent is extended or adjusted under 35 U.S.C. 154(b) by 0 days.

(21) Appl. No.: 09/981,457

(22) Filed: Oct. 16, 2001

(65) Prior Publication Data

US 2002/0045718 A1 Apr. 18, 2002

(51) Int. Cl.$^7$ ................................ C08F 4/78; C08F 4/80
(52) U.S. Cl. ...................... 502/168; 502/155; 502/216; 502/219; 502/222; 526/146; 526/172
(58) Field of Search ................ 502/155, 168, 502/216, 219, 222; 526/146, 172

(56) References Cited

U.S. PATENT DOCUMENTS 4,447,557 A * 5/1984 Pretzer et al. ............... 502/161
6,103,658 A * 8/2000 Mackenzie et al. ......... 502/167
6,511,934 B1 * 1/2003 Cook et al. ................. 502/104

* cited by examiner

*Primary Examiner*—Roberto Rabago
(74) *Attorney, Agent, or Firm*—Cesari & McKenna LLP

(57) ABSTRACT

A catalyst system and a method for preparing polymers using the catalyst system is provided. The catalyst system includes a complex represented by the formula: $[ML_y(HSR)_{ñ}]^n$, wherein M is a transition metal cation preferably in a lower oxidation state, L is a ligand, Y is a whole number between 0 and 5, ñ is a whole number between 1 and 6, n is the charge of the complex (preferably between −4 to 3), H is Hydrogen, S is sulphur and R is an organic group or hydrogen. The catalyst system advantageously has high hydrolytic stability which allows it to be used in a variety of polymerization systems including mass, solution, suspension and emulsion. In many cases only a small amount of the catalyst is required to promote polymerization.

6 Claims, No Drawings

SULPHURED-METALLIC COORDINATED COMPLEXES IN POLYADDITIVE CATALYSIS

BACKGROUND OF THE INVENTION

1. Field of the Invention

This invention relates to catalysts, and more particularly to polyaddition catalysts.

2. Background Information

The present invention deals with a novel system of coordinated complexes, and their catalytic action for the preparation of polymers based on unsaturated monomers. High polymers belong to two great families, depending on the way in which their molecular weight is reached. One group is formed by polycondensation products, where functional groups in general eliminate a sub-product, typically water. The other group is made up of polymers resulting from polyaddition, reactions involving double bonds, which form a new bond between neighboring units. The catalysts described in the present invention are applicable for the obtainment of high polymers belonging to the second group, since they interact with the double bonds of unsaturated monomers, with the consequent catenation as new single bonds are formed. There are, nevertheless, synthetic resins of poly-condensation pre-polymers containing unsaturated sites which can be reacted in a poly-additive step that leads to crosslinking, which also fall in the scope of the present invention. Among the methods of polymerization of unsaturated monomers, there is a classification based on the chemical mechanism for the initiation and propagation of the polymer. The method most widely used in industry is the one employing free radicals, which are formed within the polymerizing medium starting from various agents. There are also anionic and cationic methods, with their respective initiating agents leading to the generation of carbanions or carbocations, according to each case. Finally, one must mention the methods involving coordination catalysts, which are based on the formation of metallic complexes of very diverse types, where the metallic nucleus is found surrounded by ligands, and incorporates the monomer as a coordinated ligand in a transitory form, thus transferring propagation to other monomer molecules. One should add that in any of the methods previously mentioned, it is possible to react not only one single type of monomer, but the method is extendible to mixtures of two or more monomers, leading to the obtainment of copolymers of very diverse types. The means to obtain polymers through any of the polyaddition methods mentioned above also varies considerably, and there is no single method with a universal advantage. Basically this aspect refers to the concentration and the medium of the monomer involved in the polymerization. In such a way, there are mass polymerizations, where the monomer is polymerized in the absence of diluents. Next, one finds solution polymerization, where the monomer is dissolved in a specific solvent, in which the polymer may or may not remain in solution. There are also convenient methods employing water as the medium where polymerization is carried out, and it can be in suspension, or in turn, in emulsion with the due presence of surface active agents, mainly those of anionic type. It is important to point out that polymerization techniques that make use of water as the medium, employ the free radical mechanism almost exclusively, since other initiation systems hydrolyze readily.

There are many polymer systems where traditionally free radical initiator systems are employed because of their many advantages in the industrial processes and because of their high hydrolytic stability. Even though there is relatively little control over the molecular weight in the polymer that is obtained, because of side reactions, chain transfers, and little control over stereoisomer factors, the fact that free radical methods are compatible with aqueous systems constitutes a great advantage when compared to the other polyaddition methods. Free radical methods start from inititators like potassium of ammonium persulphate, benzoyl peroxide, cumene hydroperoxide, tertiary butyl hydroperoxide, azo compounds, or hydroperoxides with ceric or ferrous ions, etc., neither of which are succeptible to hydrolysis, at least in an appreciable fashion, during the polymerization process. Such is the way in which free radical methods are compatible with all types of systems, not only anhydrous (in mass or in solution), but also highly aqueous ones (suspension and emulsion). On one hand, cationic systems as well as anionic ones, generally require anhydrous methods. This has to do with the fact that in an aqueous medium the strongest electrophilic agent that can be formed is $H_3O^+$, which would be the hydrolysis product of any carbocation that could have been formed. On the other hand, a strong nucleophilic agent would hydrolyze rapidly, forming $OH^-$ species, which in most polyaddition cases are not energetic enough to initiate anionic catenation. Next we have the cases involving coordination catalysts, which in great measure originate from organoaluminium or organotitanium complexes, or similar derivatives originating from some type of Lewis acid. Also in these catalysts, hydrolysis poses a serious limitation, and therefore, such polymerization must be conducted under strictly anhydrous conditions.

Synthetic resin type pre-polymers, either unsaturated polyesters, alkyl resins, or vinyl ester resins are another interesting case. When these resins are manufactured, an easy-to-handle material is made, un-crosslinked, which can be molded or laminated conveniently and its final curing be reached later under adequate catalysis. Unsaturation is made up of carbon—carbon double bonds present in the pre-polymer and also under the form of an unsaturated monomer which is also added as diluent. In the pre-polymer there can be structures with allylic hydrogens or maleic-fumaric units. Diluent monomers are usually styrene, alfa-methyl styrene, methyl methacrylate, and other similar ones. Catenation methods employed for crosslinking of the mentioned resins are essentially of the solution and mass type, and use redox methods based on ketone hydroperoxides or benzoyl peroxide with transition organometals or aromatic tertiary amines. Up to this moment no other catalytic method has been developed for the curing of the resins mentioned, with the exception of actinic radiation, which is applicable to films of minimum thickness.

SUMMARY OF THE INVENTION

A catalyst system and a method for preparing polymers using the catalyst system is provided. The catalyst system includes a complex represented by the formula $[ML_y(HSR)_n]^n$, wherein M is a transition metal cation preferably in a low oxidation state, L is a ligand, Y is a whole number between 0 and 5, $\bar{n}$ is a whole number between 1 and 6, H is Hydrogen, S is sulphur and R is any organic group or hydrogen, and the complex has a charge of n. The catalyst system advantageously has high hydrolytic stability which allows it to be used in a variety of polymerization systems including mass, solution, suspension and emulsion.

The transition metal is preferably cobalt, but other transition metals such as chromium, manganese and iron can be used.

The catalyst system can be formed prior to contact with the compound to be polymerized or can be formed in situ in the medium where the polymerization takes place.

DETAILED DESCRIPTION OF AN ILLUSTRATIVE EMBODIMENT

As discussed above, the catalyst system disclosed in the present invention has wide applications and is made up of coordination complexes where the nucleus is formed by a transition metal selected from the group formed by chromium, manganese, iron and cobalt, preferably in a low oxidation, state and is surrounded by ligands derived from sulphur up to the limit of the coordination sphere, which generally lies in the number of six. Part of the coordination sphere can be occupied by a different type of ligand, but this can affect both the opening of the crystal field and the catalytic activity. In any case, a good level of reactivity is obtained, even though this is increased with a larger magnitude of 10 Dq, which measures the opening of the mentioned crystal field and reflects the function of the "d" orbitals.

The transition metals of the complex, as discussed above, should be preferably in a lower oxidation state, for example, $Cr^{3+}$, $Mn^{2+}$, $Fe^{2+}$, $Co^{2+}$. These metals may come directly from inorganic salts (e.g. nitrates, sulphates, chlorides) or from carboxylated derivatives of organic nature (e.g. acetates, naphtenates, oxalates, octoates, stearates, oleates, palmitates, decanoates). The presence of other ligands is allowed, as long as the coordination sphere of the metal is not saturated, or that these other ligands are labile enough to be displaced by sulphured ligands when so contacted. Contact medium can be either of the organic or the aqueous type, depending on the degree of solubility of the components. As far as the sulphured derivatives, these are characterized by the structure HSR, where H and S are respectively hydrogen and sulphur, and the R group can also be hydrogen or any aryl or alkyl organic group made up primarily of carbon and hydrogen, but also capable of containing sulphur, nitrogen and oxygen. The sulphured derivatives thus include hydrogen sulphide, and every type of thiol or mercaptan like ethyl mercaptan, butyl mercaptan, hexyl mercaptan, octyl mercaptan, dodecyl mercaptan, stearyl mercaptan (all of which may have straight or branched chains), as well as benzyl mercaptan, napthyl mercaptan, benzoyl mercaptan, and thioglycolic acid.

The mercaptans, to form the catalyst, can be a starting material, or also precursors and formed in situ from mixtures of a corresponding organic halide (RX), such as an alkyl bromide (RBr), and aqueous thiourea, which upon hydrolysis render the thiol according to the reaction described in the textbook Vogel's textbook of Practical Organic Chemistry (5th Ed 1989) authored by S. Furniss, A. J. Hannaford, P. W. G. Smith and A. R. Tatchell at Section 5.17.1, pages 787–789. This section is hereby incorporated by reference.

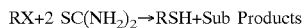

$$RX + 2\ SC(NH_2)_2 \rightarrow RSH + Sub\ Products \qquad Eq.\ 1$$

The coordination reaction to form the catalysts herein described herein is fast, and it suffices to homogenize the metallic components and the sulphured ones in an adequate medium in order to form complexes which have very intense colors. The same can be prepared prior to their introduction in the polymerization system, or the components can be added to the polymerization system, allowing the formation of a complex within the medium in which polyaddition takes place. The following equation illustrates the general formation of the coordinated metallic-sulphured complex catalyst for a cation of valence +n

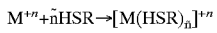

$$M^{+n} + \bar{n}HSR \rightarrow [M(HSR)_{\bar{n}}]^{+n} \qquad Eq.\ 2$$

As it has been mentioned previously, the metallic center can also have coordinated ligands prior to interaction with the sulphured derivative, in which case the following can happen to form the metallic sulphured complex:

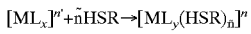

$$[ML_x]^{n'} + \bar{n}HSR \rightarrow [ML_y(HSR)_{\bar{n}}]^n \qquad Eq.\ 3$$

In equations 2 and 3, M is the metallic cation preferably in a lower oxidation state, $\bar{n}$ and x are whole numbers between 0 and 6, and Y is a whole number between 0 and 5. L is any ligand coordinated to the cation M, while n and n' represent the charge of the complex, and can be any integer between −4 to 3 (including 0), and are equivalent if L is a neutral ligand. There are many ligands, which can be utilized such as aquo, amino, hidroxo, thiocyanato, trifluoroborato, nitro, nitrato, cyano, phosphino, and carboxo. Multi-binding ligands such as chelating agents like dimethylglyoxime, phenanthroline, and ethylenediamine also form complexes with enhanced catalytic activity. Those ligands which induce higher 10 Dq values in the cation was preferably because they cause greater opening of the d-orbital crystal field and a more pronounced catalytic activity of the complex. Their effect can be predicted in most cases according to the spectrochemical series (see Cotton and Wilkinson, Advanced Organic Chemistry, 3rd Ed.).

As discussed above, H and S are respectively hydrogen and sulphur, and the R group can be hydrogen or an organic group including aryl or aklyl organic groups made up primarily of carbon and hydrogen, but also capable of containing sulphur, nitrogen and oxygen.

Depending on the starting material which provide the transition metal of the complex, the catalyst can have the formula $A_I[ML_y(HSR)_{\bar{n}}]$, where A can be a nitrate, sulphate chloride or a carboxylated derivative such as an acetate, napthenate, stearate, oleate, palmitate, decanoate, oxalate or octoate, and I can be 1, 2 or 3.

The novel metallic sulphured complexes of the present invention are effective catalysts for polymerization of unsaturated monomers such as olefins, conjugated dienes, vinyl monomers and allyl compounds, including styrene, methyl styrene, acrylonitrile, acrylic acid, methacrylic adid, acrylamide, methacrylamide, methyl methacrylate, ethyl methacrylate, maleic anhydride, maleic acid, fumaric acid, isoprene, butadiene, chloroprene, vinyl acetate, vinyl chloride, vinyledene chloride, ethylene, propylene, butylene, isobutylene, alpha olefins, allyl alcohol, and alklyl vinyl ethers, and mixtures thereof through polyaddition. Polymerization is likely to occur via a coordination mechanism, since there is no consumption of molecular parts of the catalyst, which can be detected in an active form after consumption of monomer. Activity of the complex is favored by a large excess of the thiol, (relative to metal cation) as equilibrium would indicate. These catalysts are effective even when very small amounts of the metallic complex are employed, in the order of parts per million relative to monomer concentration.

It is important to highlight that in the literature it has long been established that thiols or mercaptans by themselves only act as chain transfer agents in polyaddition by free radicals (Odian, Principles of Polymerization). Nevertheless, little is known about metallic complexes in this regard. More recently it has been made known that certain cobalt complexes of high crystal field do act as chain transfer agents, and even with much greater efficiency than that of thiols (Suddaby et al, Macromolecules, 29, 8083 (1996)). The importance of this behavior lies in the fact that high 10 Dq cobalt necessarily coordinates to the unsaturated electrons of the monomer. The result of this action continuing propagation. Under the present invention various unsaturated polyester resins containing cobalt and manganese promoters have been crosslinked by merely adding a small amount of mercaptans in closed systems. In a similar fashion, other monomers have been polymerized, such as styrene, methyl methacrylate, isoprene, mixtures of styrene and maleic-fumaric acids, and others. Some of these polymerizations have been in mass, others in solution, and still others in suspension and emulsion.

The present invention involves the preparation and use of coordinated catalyst complexes of certain transition metals with sulphured compounds for the preparation of high polymers by polyaddition of unsaturated monomers. The catalysts can be added as prepared compounds to a polymerizable system, namely in mass, solution, suspension, or emulsion, and under relatively mild conditions of temperature, between about 10 to about 180° C. (preferably between about 25 and about 75° C.). It is better to exclude oxygen to avoid its interference, but other precautions, like the absence of water, do not pose a problem due to the hydrolytic stability of the catalysts herein. The catalysts can also be formed in situ by adding the components separately to the polymerizing mixture, such as mixing metallic carboxylates with mercaptans inside the polymerizing system. In addition, it is possible to prepare the desired mercaptan starting from a corresponding organic halide and, mixing it with aqueous thiourea and hydrolyzing the intermediate, as discussed above.

This system is very effective to mass polymerize styrenic-maleic entities, such as those present in unsaturated polyester resins promoted with cobalt or manganese, where all that is required is the addition of a small quantity of mercaptan soluble in this medium. On the other hand, it is possible to prepare a pure mixture of styrene with maleic-fumaric units in order to obtain a high polymer in a mass process. In addition, the same process can be carried out in solution in an adequate medium such as dimethylformamide or tetrahydrofuran. Extension of this process to other polymerization methods, aqueous type is of particular importance, because the hydrolytic stability value is highlighted in the present coordination system. Thus, styrene has been mixed with water, and other monomers such as methacrylic acid and methyl methacrylate have been added to the mixture. This has given polymerization products in suspension. In a more elaborate form, surfactants, such as sodium stareate or benzalkonium chloride have been added to the aqueous system and respective emulsions have been obtained. In these latter emulsion systems, isoprene, chloroprene, and butadiene have been successfully polymerized in a latex form.

EXAMPLES

Example 1

A 25 g sample of cobalt-promoted polyester resin (0.15% by mass of the resin (approximately 0.038 g) cobalt octoate having 6% metal) was introduced in an air-tight vessel, followed by 0.25 mL of butyl thiol. After thorough mixing, the vessel was closed and allowed to sit at (of room temperature about 20° C.). The resin became vitrified as polymerization occurred overnight.

Example 2

Example 1 was repeated substituting butyl thiol with an equal volume of dodecyl thiol, and similar results were obtained.

Example 3

Example 1 was repeated substituting butyl thiol with hydrogen sulphide (estimated as 2.5 mmoles) bubbled through the vessel, and similar results were obtained.

Example 4

Example 1 was repeated substituting cobalt octoate with manganese naphthenate, (0.15% by mass of 6% metal compound) and similar results were obtained.

Example 5

Example 1 was repeated substituting cobalt octoate with iron naphthenate (0.15% by mass of 6% metal compound), and similar results were obtained.

Example 6

Example 1 was repeated substituting cobalt octoate with chromium naphthenate (0.15% by mass of 6% metal compound), and similar results were obtained.

Example 7

A 50 g portion of butyl bromide was reacted at 100° C. for two hours with 35 g of thiourea in 40 mL of water, and the product hydrolyzed. A 2 mL portion of this product was introduced in place of butyl thiol in Example 1, and similar results were obtained.

Example 8

A 15 g sample of styrene was introduced into a 150 mL aqueous solution of 5% w/w sodium stearate, and under hermetic agitation and 0° C. conditions, the pyrolysis product (i.e. butadiene and sulphur dioxide) of 100 g of sulpholene after bubbling through an alkaine solution, was bubbled through. A 0.1 g sample of cobalt octoate (6% metal) was introduced, plus 1 g of butyl thiol, and the mixture stirred at 60° C. under hermetic conditions for 24 hours. An SBR type latex was obtained.

Example 9

Example 1 was repeated, except that this time 10 g of methyl methacrylate was added prior to the thiol, and similar results were obtained.

Example 10

A solution of 10 g of styrene and 10 g of maleic anhydride in 100 mL of dimethylformamide was prepared in a hermetic vessel, and 0.01 g of cobalt octoate was added with 0.25 mL of dodecyl thiol. The solution was stirred overnight at 60° C., and showed a sensible increment in viscosity as the polymer formed.

What is claimed is:

1. A catalyst system comprising:

a complex with the formula;

wherein M is a transition metal cation;

L is a ligand;

y is a whole number between 0 and 5;

ñ is a whole number between 1 and 6;

n is the charge of the complex;

H is Hydrogen;

S is sulphur; and

R is any organic group or hydrogen, wherein L is selected from the group consisting of cyano, amino, aquo, hydroxo, thiocyanato, trifluoroborato, phosphino, nitro, nitrato, and carboxo.

2. A catalyst system comprising:

a complex with the formula:

$$[ML_y(HSR)_n]^{\tilde{n}-}$$

wherein M is a transition metal cation;

L is a ligand;

y is a whole number between 0 and 5;

$\tilde{n}$ is a whole number between 1 and 6;

n is the charge of the complex;

H is Hydrogen;

S is sulphur; and

R is any organic group or hydrogen, wherein -L is a chelating agent selected from the group consisting of dimethylglyoxime, phenanthroline, and ethylenediamine.

3. The system of claim 1, wherein the transition metal is selected from the group consisting of cobalt, manganese, chromium and iron.

4. The system of claim 2, wherein the transition metal is selected from the group consisting of cobalt, manganese, chromium and iron.

5. The system of claim 1, wherein M is selected from the group consisting of $Co^{2+}$, $Mn^{2+}$, $Fe^2$, and $Cr^{3+}$.

6. The system of claim 2, wherein M is selected from the group consisting of $Co^{2+}$, $Mn^{2+}$, $Fe^2$, $Cr^{3+}$.

* * * * *